United States Patent
Singh et al.

(10) Patent No.: US 11,775,860 B2
(45) Date of Patent: Oct. 3, 2023

(54) REINFORCEMENT LEARNING IN ROBOTIC PROCESS AUTOMATION

(71) Applicant: UiPath, Inc., New York, NY (US)

(72) Inventors: Prabhdeep Singh, Bellevue, WA (US); Marco Alban Hidalgo, Bellevue, WA (US)

(73) Assignee: UiPath, Inc., New York, NY (US)

( * ) Notice: Subject to any disclaimer, the term of this patent is extended or adjusted under 35 U.S.C. 154(b) by 818 days.

(21) Appl. No.: 16/707,858

(22) Filed: Dec. 9, 2019

(65) Prior Publication Data

US 2021/0110300 A1 Apr. 15, 2021

Related U.S. Application Data

(60) Provisional application No. 62/915,385, filed on Oct. 15, 2019.

(51) Int. Cl.
*G06N 5/04* (2023.01)
*G06N 20/00* (2019.01)

(52) U.S. Cl.
CPC .............. *G06N 20/00* (2019.01); *G06N 5/04* (2013.01)

(58) Field of Classification Search
CPC ...................................... G06F 17/18
See application file for complete search history.

(56) References Cited

U.S. PATENT DOCUMENTS

| | | |
|---|---|---|
| 2007/0203871 A1 | 8/2007 | Tesauro et al. |
| 2018/0129974 A1 | 5/2018 | Giering et al. |
| 2019/0102676 A1 | 4/2019 | Nazari et al. |
| 2019/0235481 A1* | 8/2019 | Takigawa .............. G05B 23/024 |
| 2019/0236455 A1* | 8/2019 | Taylor .................. G06K 9/6274 |
| 2019/0244133 A1 | 8/2019 | Nakada et al. |
| 2019/0347301 A1* | 11/2019 | Morales ................ H04L 67/535 |
| 2019/0354746 A1* | 11/2019 | Zhang .................... G06V 40/45 |
| 2020/0065334 A1* | 2/2020 | Rodriguez .......... H04M 3/5183 |
| 2020/0097357 A1* | 3/2020 | Shwartz ................... G06F 8/70 |
| 2020/0206920 A1* | 7/2020 | Ma ..................... G06F 18/23213 |
| 2020/0374298 A1* | 11/2020 | Sirianni .............. H04L 63/1425 |

(Continued)

FOREIGN PATENT DOCUMENTS

| | | |
|---|---|---|
| CN | 109669452 A | 4/2019 |
| CN | 109740738 A | 5/2019 |

OTHER PUBLICATIONS

Dilip Arumugam et al., "Deep Reinforcement Learning from Policy-Dependent Human Feedback," arXiv:1902.04257v1 (Feb. 12, 2019).

(Continued)

*Primary Examiner* — Di Xiao
(74) *Attorney, Agent, or Firm* — LeonardPatel PC; Michael A. Leonard, II; Sheetal S. Patel

(57) ABSTRACT

Reinforcement learning may be used to train machine learning (ML) models for robotic process automation (RPA) that are implemented by robots. A policy network may be employed, which learns to achieve a definite output by providing a particular input. In other words, the policy network informs the system whether it is getting closer to the winning state. The policy network may be refined by the robots automatically or with the periodic assistance of a human in order to reach the winning state, or to achieve a more optimal winning state. Robots may also create other robots that utilize reinforcement learning.

16 Claims, 6 Drawing Sheets

(56) References Cited

U.S. PATENT DOCUMENTS

2021/0073995 A1* 3/2021 Yang .................... G06N 3/006
2021/0142539 A1* 5/2021 Ayush ................... G06T 11/00
2022/0147865 A1* 5/2022 Naidoo ................. G06N 3/088

OTHER PUBLICATIONS

International Search Report and Written Opinion of the International Search Authority issued by the Korean Intellectual Property Office dated Nov. 20, 2020.
Ngo Anh Vien et al., "Reinforcement Learning Combined with Human Feedback in Continuous State and Action Spaces," In: 2012 IEEE International Conference on Development and Learning and Epigenetic Robotics (ICDL) (Nov. 9, 2012).
Pavel Kaarnijoki, Intelligent Automation: Assessing artificial intelligence capabilities potential to complement robotic process automation, Tampere University, Master of Science Thesis (Jan. 2019).
W. Bradley Knox et al., "Combining manual feedback with subsequent MDP reward signals for reinforcement learning," In: AAMAS '10: Proceedings of the 9th International Conference on Autonomous Agents and Multiagent Systems, vol. 1, pp. 5-12 (May 2010).
First Examination Report issued in Indian Application No. 202217022167 dated Jun. 27, 2023.
W. Bradley Knox and Peter Stone, "Combining Manual Feedback with Subsequent MDP Reward Signals for Reinforcement Learning," Proc. of 9th Int. Conf. on Autonomous Agents and Multiagent Systems (AAMAS 2010).

* cited by examiner

REINFORCEMENT LEARNING IN ROBOTIC PROCESS AUTOMATION

CROSS-REFERENCE TO RELATED APPLICATION

This application claims the benefit of U.S. Provisional Patent Application No. 62/915,385 filed Oct. 15, 2019. The subject matter of this earlier filed application is hereby incorporated by reference in its entirety.

FIELD

The present invention generally relates to robotic process automation (RPA), and more specifically, to reinforcement learning in RPA.

BACKGROUND

Most current machine learning algorithms utilize historical data as a basis for learning. However, in reinforcement learning, a balance of using both exploitation of existing knowledge and exploration of the unknown is used. In exploration, random actions guided by current knowledge are employed in an attempt to get closer to an objective function (i.e., a "winning" state). In other words, when the winning state is not reached, such algorithms implement explorative functionality. Such techniques have been used to teach a computer to play "breakout" and "go" games.

Reinforcement learning is not used in the context of RPA. Also, conventional reinforcement learning techniques take massive amounts of computing power and substantial amounts of time, which renders them unsuitable for many applications. Accordingly, an improved reinforcement learning solution may be beneficial.

SUMMARY

Certain embodiments of the present invention may provide solutions to the problems and needs in the art that have not yet been fully identified, appreciated, or solved by current RPA technologies. For example, some embodiments of the present invention pertain to reinforcement learning in RPA.

In an embodiment, a computer-implemented method for training an ML model for RPA using reinforcement learning includes training the ML model by running simulations on training data using the ML model. The ML model has a reward function. When the ML model does not achieve convergence defined by the reward function based on one or more criteria, the computer-implemented method includes requesting human assistance, monitoring actions taken by a human on a computing system, and modifying a policy network for the ML model, the reward function, or both, based on the actions taken by the human.

In another embodiment, a computer-implemented method for training an ML model for RPA using reinforcement learning includes running simulations on training data using the ML model. The ML model has a reward function. When the ML model does not achieve convergence defined by the reward function based on one or more criteria, the computer-implemented method includes monitoring actions taken by a human on a computing system and modifying a policy network for the ML model, the reward function, or both, based on the actions taken by the human. The computer-implemented method includes repeating the steps of running the simulations on the training data using the ML model, monitoring the actions taken by the human on the computing system, and modifying the policy network, the reward function, or both, until convergence is achieved.

In yet another embodiment, a computer-implemented method for training an ML model for RPA using reinforcement learning includes training the ML model using a policy network. The ML model has a reward function. The computer-implemented method also includes deploying the trained ML model. The deployment of the trained ML model includes modifying one or more activities in an RPA workflow implemented by an RPA robot to call the trained ML model. The computer-implemented method further includes calling the trained ML model at runtime, by the RPA robot.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
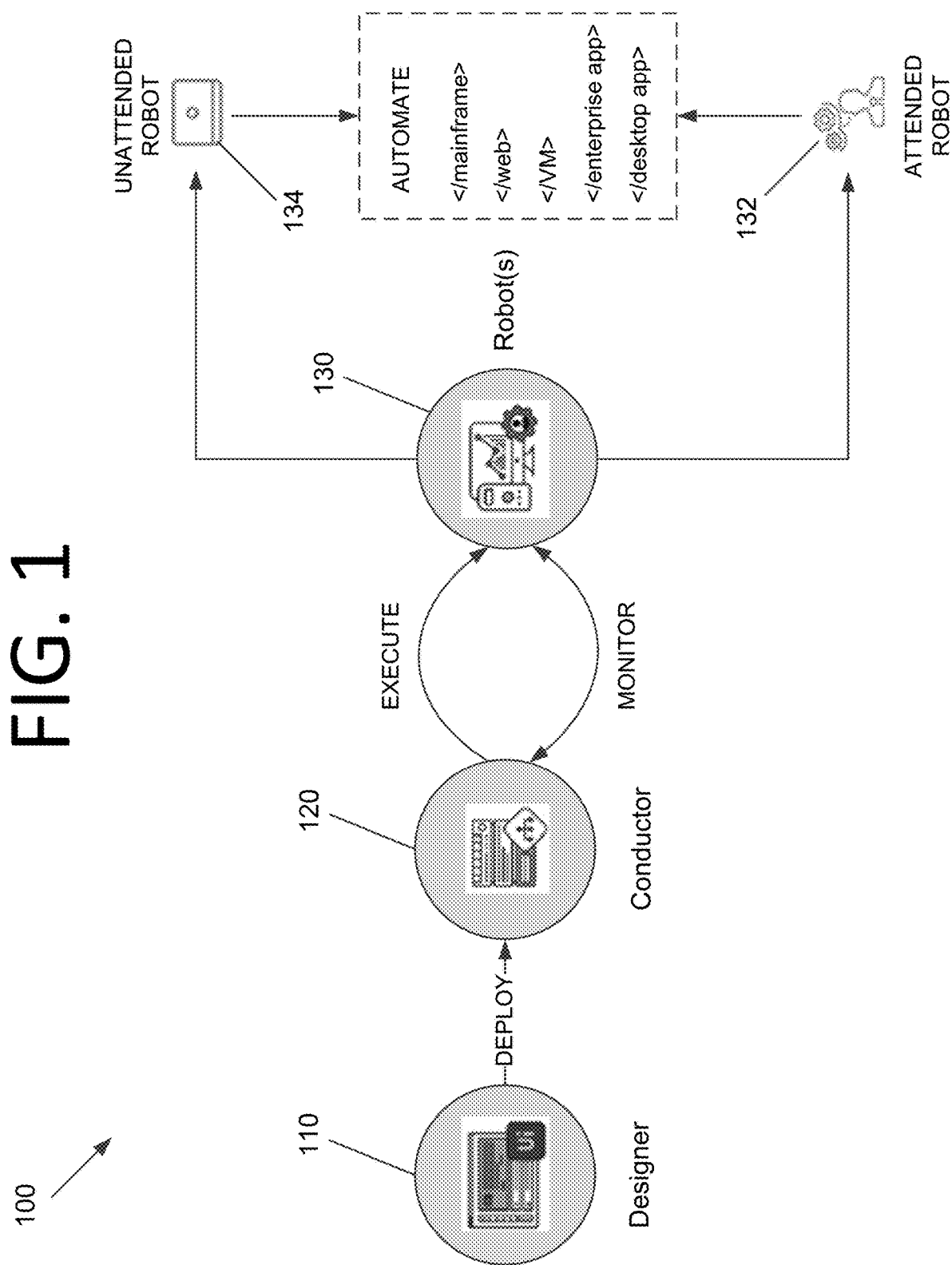
FIG. 1 is an architectural diagram illustrating an RPA system, according to an embodiment of the present invention.

Some embodiments pertain to reinforcement learning in RPA. In reinforcement learning, there is an exploration phase. Process mining may provide the various states of a system (e.g., by deploying listeners on computing systems and collecting information pertaining to actions taken by users, robots, or both, on those computing systems, such as clicking buttons, opening/closing applications, entering text, etc.). By specifying a start state (e.g., a set of email addresses) and an end state (e.g., all email addresses ending up properly entered in Salesforce®), the system may attempt to randomly find the solution from the start state to the end state using a reward function that explores intermediate transitions and steps with both short term and long term rewards to guide the search of the state space. For trading, for example, the system could be asked to keep trading randomly until it makes money.

However, the system requires some guidance to achieve this goal. If a solution is not reached on certain criteria (e.g., a certain number of trials, a predetermined amount of time, etc.), the system may request human guidance. This process may be repeated until the solution is reached.

Some embodiments employ a policy network, which tweaks and defines the reward function. In some embodiments, this may be accomplished by the system watching actions taken by a human. If the human corrects the operation by taking an action on a computing system, whether knowing that he or she is interacting with a robot or not, the policy network may learn from this action and incorporate it into the reward function. This helps the robot get closer to the reward function goal. In other words, the policy network informs the robot whether it is getting closer to the winning state. As used herein, the winning state may not pertain to a game. Rather, any suitable desired outcome including, but not limited to, correctly recognizing a face or human emotion in an image, processing a document, controlling a vehicle in a desired manner, or any other suitable desired outcome without deviating from the scope of the invention.

To get closer to the winning state, the robot could analyze the underlying distribution. If results are falling in the same range (e.g., within half a standard deviation, one standard deviation, etc.), this provides information regarding the performance of the robot. The analysis could be a lookup function, a statistical distribution, etc. For example, if the robot is unable to login to Salesforce®, the robot can watch a human do so. In other words, the robot may monitor the application programming interface (API) calls made by the human (e.g., the human clicks a username field, enters the username, clicks a password field, enters, the password, and clicks a submit button).

Rather than performing completely random exploration, some embodiments determine what the policy should be via the policy network. This may drastically reduce the number of simulations required to achieve a winning state, which enables machine learning (ML) models trained via reinforcement learning to be developed and deployed more quickly, to be trained using fewer computing hardware resources, or both. Indeed, in some embodiments, reinforcement learning may be performed on a user's own computing system, such as a desktop computer, a laptop computer, a smart phone, etc., which is typically not possible conventionally.

In the context of interacting with a user interface, for example, a robot may randomly click on a screen to determine what is clickable. Reinforcement learning may then be used to move a desired automation ahead. For instance, given a spreadsheet of email addresses and desired email text, reinforcement learning may be used to discover which clickable button opens an email application, discover where different text should be entered in the email, and discover the button to click to send the email. In this example, the policy network may be used to first determine whether sending an email is even possible or desired. Once this determination is made, the policy network may then determine whether the email addresses from the spreadsheet and the email body text can be copied into the email before sending.

With complex use cases, initially determining what the reward function should be is often difficult or impossible. For example, consider the case of trying to infer what a human is doing using a video feed from a camera. Humans may be involved in further refining the reward function if the reward function is not converging quickly enough or at all, for example. A controlled environment may be provided at design time for testing and training the ML model and for refining the reward function. At runtime, new or refined ML models could be deployed, and the workflows implemented by the robots could be modified to call the new or refined ML models by modifying respective activities in the workflow.

By way of nonlimiting example, consider a case where it is desired to train an RPA robot to learn how to find the lowest price per unit on Amazon® using reinforcement learning, where there are millions of links. While the robot may be able to randomly explore links and click around in a simulation environment, there are too many options for the robot to reasonably follow and achieve convergence to a winning state. A human may initially review the robot's actions and provide some guidance (e.g., showing the robot how to put in a keyword and where to click by doing so manually). The robot watches these actions and then learns not to click mindlessly. Once this input is given, the robot can train and explore further. The robot then modifies its policy network and gets closer to the desired results. A human may continue to periodically provide some guidance, or provide guidance under certain conditions, until the robot has sufficient guidance to achieve convergence.

Humans may thus assist the robots at any desired layer in training, personalization, etc. to make the ML model more effective. When and whether to involve humans may depend on the specific application and behavior. For instance, if performance of the ML model is declining beyond a certain threshold, that may trigger the system to ask a human for next steps and/or examples. In the Amazon® example, if the robot performs 10,000 clicks without obtaining an answer, human review and guidance may be initiated.

In some embodiments, robots may utilize reinforcement learning to automatically build policy networks themselves. These policy networks may be built based on observation of human interactions with the computing system in a given scenario (e.g., which APIs are called). In certain embodiments, RPA robots themselves may build other robots that implement reinforcement learning.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
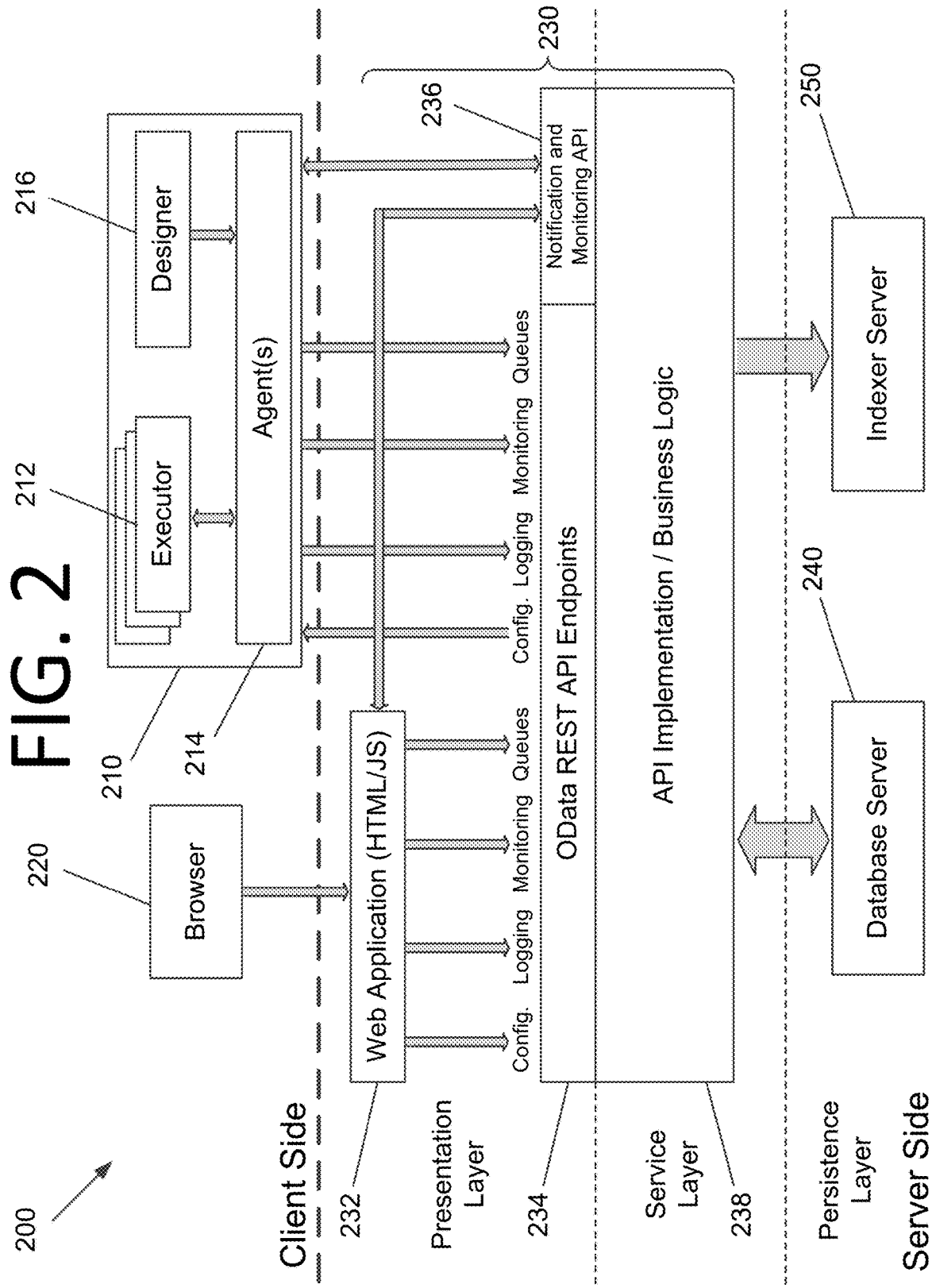
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210.

Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint (s) to indexer server 250, where they are indexed for future utilization.

Figure 3:
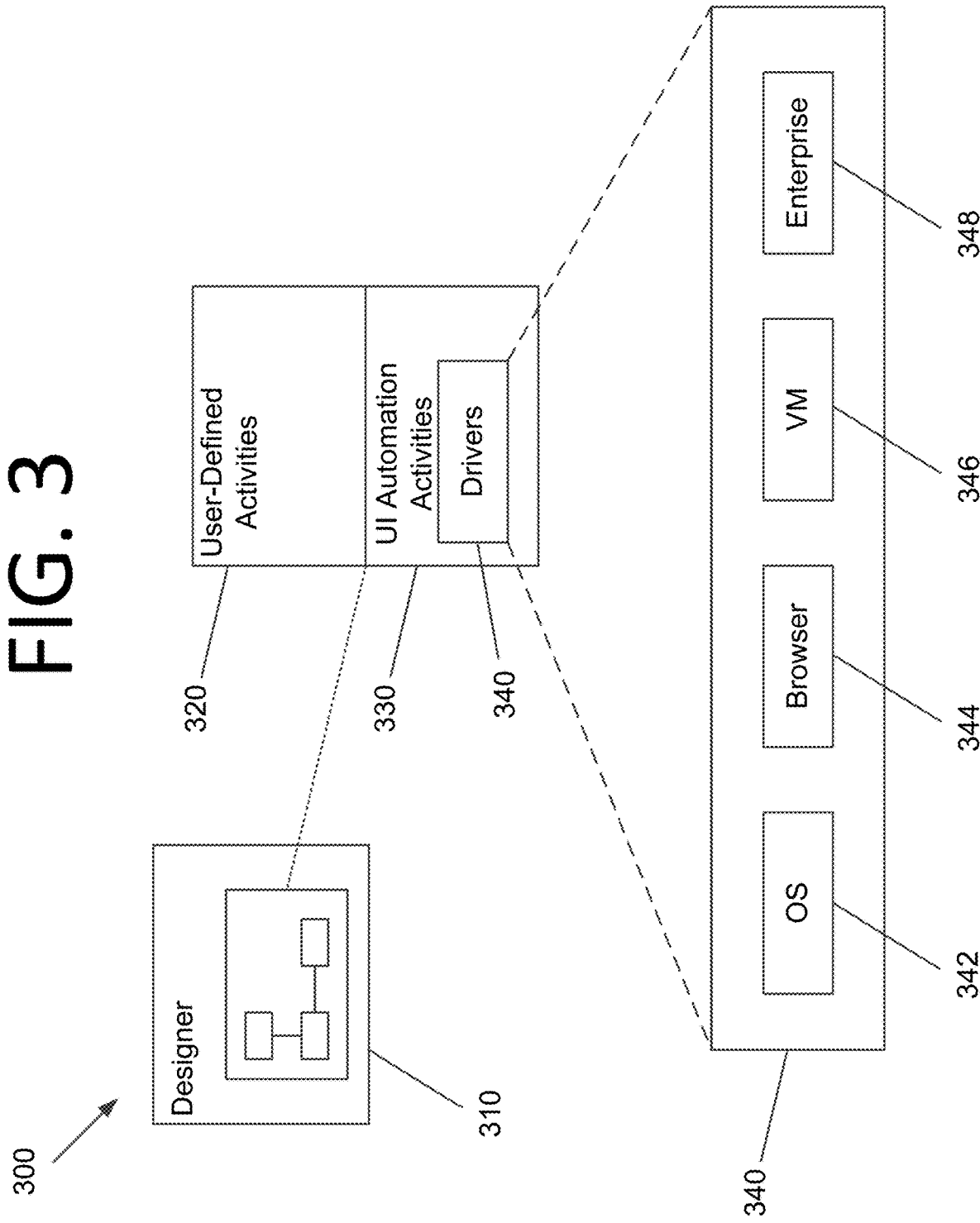
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
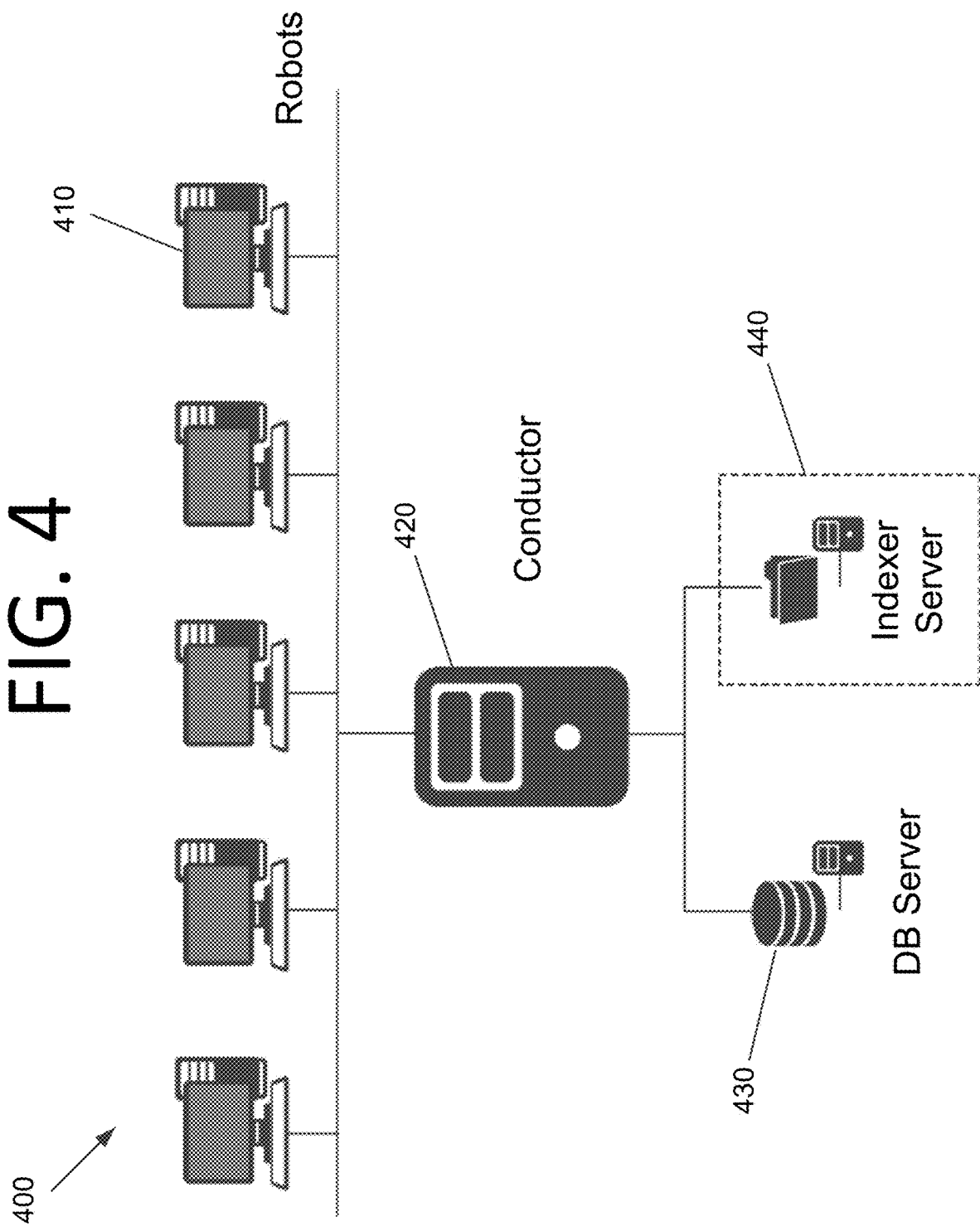
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
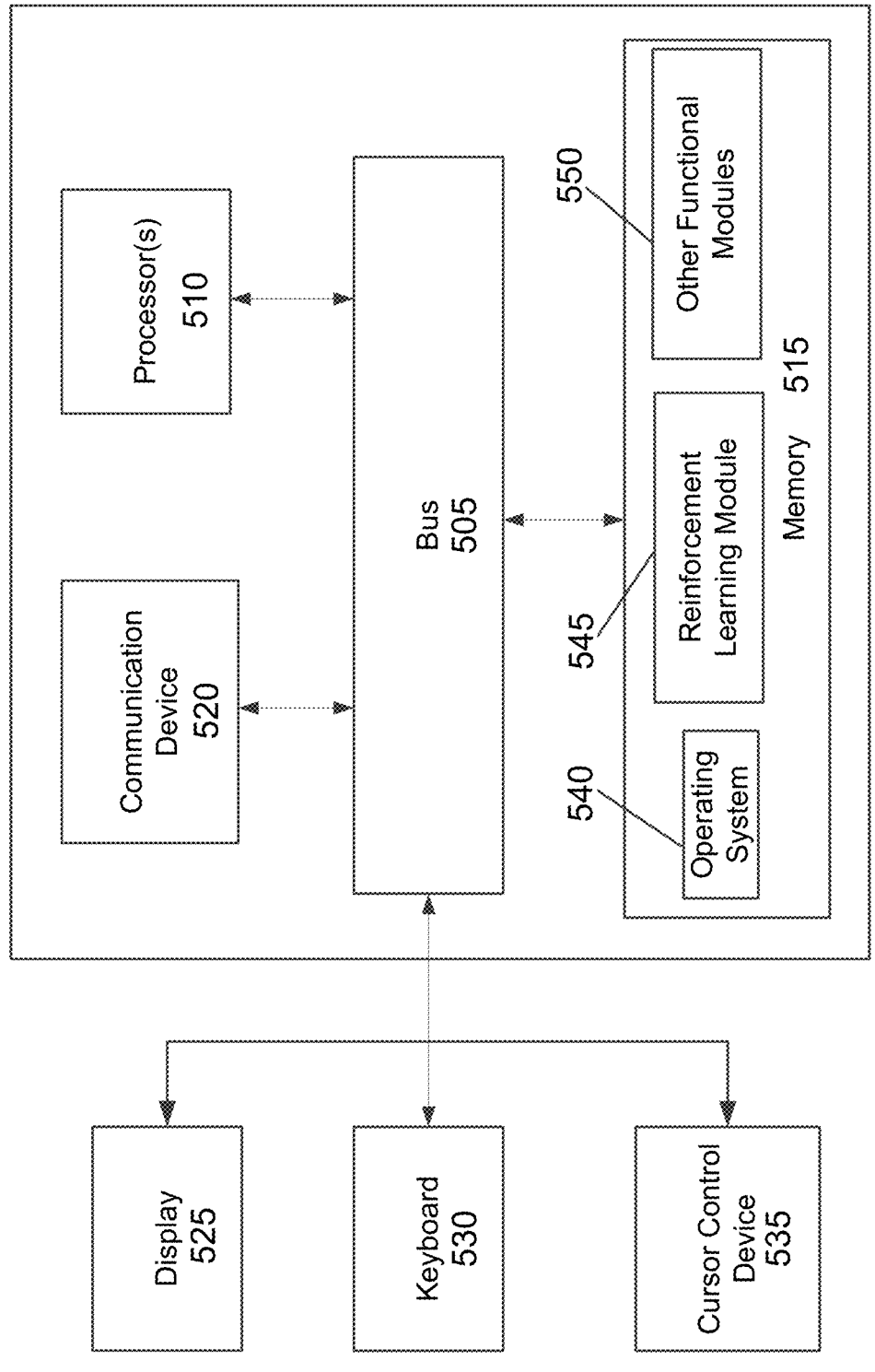
FIG. 5 is an architectural diagram illustrating a computing system configured to implement reinforcement learning in RPA, according to an embodiment of the present invention.

FIG. 5 is an architectural diagram illustrating a computing system 500 configured to implement reinforcement learning in RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a reinforcement learning module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
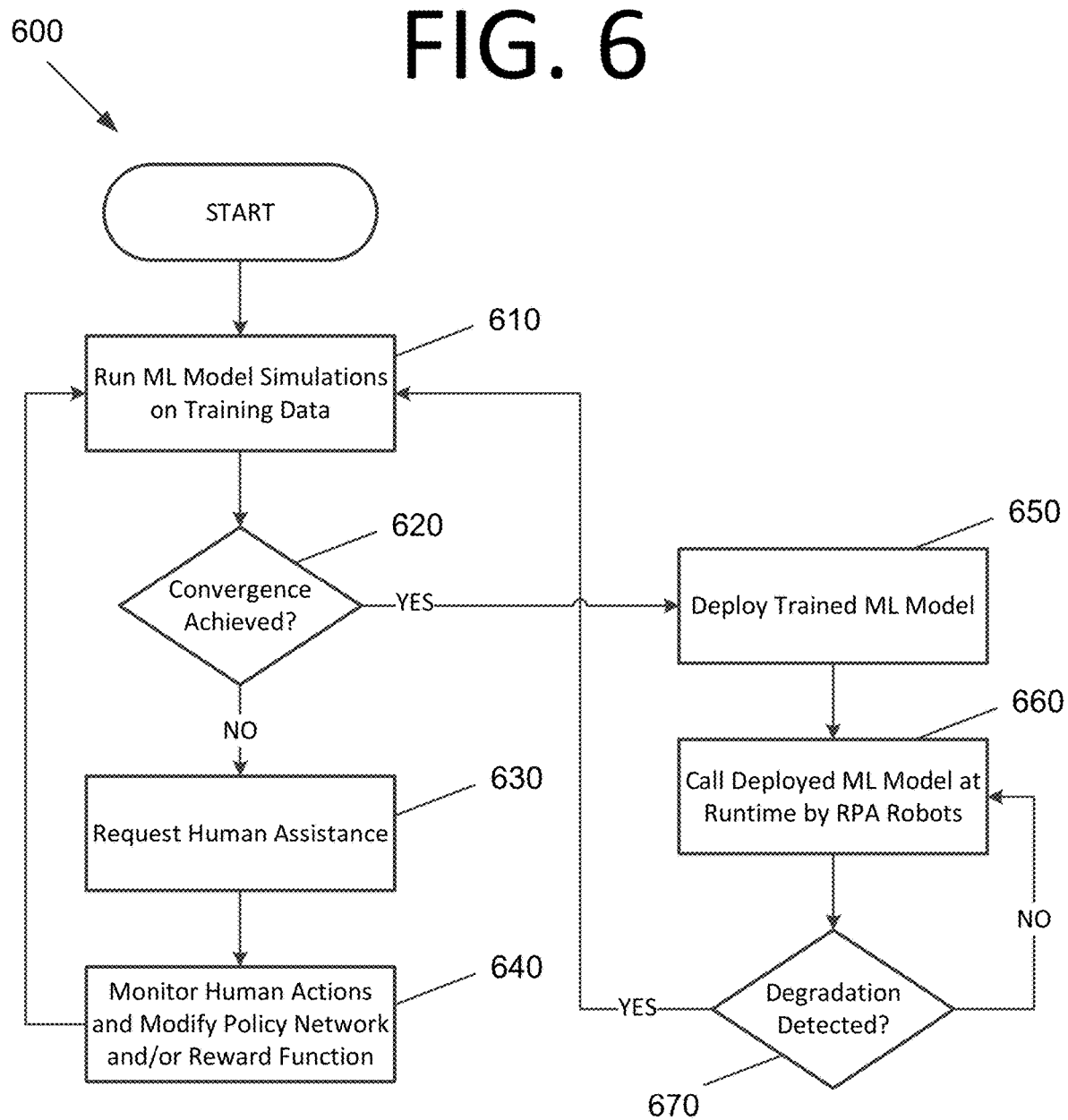
FIG. 6 is a flowchart illustrating a process for implementing reinforcement learning in RPA, according to an embodiment of the present invention.

FIG. 6 is a flowchart illustrating a process 600 for implementing reinforcement learning in RPA, according to an embodiment of the present invention. In some embodiments, the training may be performed by a server, a user computing system, an RPA robot, or any combination thereof. The process begins with training an ML model having an initial reward function by running simulations on training data using the ML model at 610. When the ML model does not achieve convergence (i.e., the ML model does not arrive at the winning state) defined by a reward function based on one or more criteria (e.g., after a predetermined number of simulations, after a predetermined amount of time, a combination thereof (e.g., after a predetermined amount of time unless a predetermined number of trials occur in the interim), etc.) at 620, human assistance is requested at 630 and the robot watches actions taken by the human and modifies a policy network for the ML model, the reward function, or both, at 640. For instance, the robot may monitor API calls made during the human's interactions with his or her computing system and learn to mimic them. The process then returns to step 610 to execute further simulations on the training data using the revised policy network, the revised reward function, or both.

The process of requesting human assistance, modifying the policy network, and performing further simulations is repeated until convergence is achieved at 620. The trained ML model is then deployed at 650 and the deployed ML model is called at runtime by RPA robots at 660. In some embodiments, deployment of the trained ML model includes modifying one or more activities in RPA workflows implemented by the RPA robots to call the trained ML model. If it is detected that performance of the ML model is declining beyond a predetermined performance threshold (e.g., detection accuracy falls below the predetermined threshold, the goal of the reward function is being achieved less often without human action, etc.) at 670, the process returns to step 610 to perform retraining of the ML model.

The process steps performed in FIG. 6 may be performed by a computer program, encoding instructions for the processor(s) to perform at least part of the process(es) described in FIG. 6, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for training a machine learning (ML) model for robotic process automation (RPA) using reinforcement learning, comprising:
   training the ML model by running simulations on training data using the ML model, the ML model having a reward function; and
   when the ML model does not achieve convergence defined by the reward function based on one or more criteria:
   requesting human assistance, monitoring actions taken by a human on a computing system, and modifying a policy network for the ML model, the reward function, or both, based on the actions taken by the human, wherein the trained ML model is configured to be called by an RPA robot;
   repeating the steps of running the simulations on the training data using the ML model, requesting human assistance, monitoring the actions taken by the human on the computing system, and modifying the policy network, the reward function, or both, until convergence is achieved.

2. The computer-implemented method of claim 1, wherein the training of the ML model, requesting human assistance, monitoring the actions taken by the human on the computing system, and modifying the policy network, the reward function, or both, are performed by the RPA robot.

3. The computer-implemented method of claim 1, wherein after convergence is achieved, the method further comprises: deploying the ML model; and calling the ML model at runtime, by the RPA robot.

4. The computer-implemented method of claim 3, wherein the deployment of the ML model comprises modifying one or more activities in an RPA workflow implemented by the RPA robot to call the trained ML model.

5. The computer-implemented method of claim 3, further comprising:
   detecting, by the RPA robot, that performance of the ML model is declining beyond a predetermined performance threshold; and
   retraining the ML model until convergence is achieved.

6. The computer-implemented method of claim 5, wherein the predetermined performance threshold comprises detection accuracy or a frequency with which convergence is achieved without user action.

7. The computer-implemented method of claim 1, wherein the one or more criteria comprise a predetermined number of trials, a predetermined amount of time, or a combination thereof.

8. The computer-implemented method of claim 1, wherein the monitoring of the actions taken by the human comprises monitoring application programming interface (API) calls made based on the actions taken by the human.

9. A computer-implemented method for training a machine learning (ML) model for robotic process automation (RPA) using reinforcement learning, comprising:
   running simulations on training data using the ML model, the ML model having a reward function;
   when the ML model does not achieve convergence defined by the reward function based on one or more criteria:
   monitoring actions taken by a human on a computing system, and
   modifying a policy network for the ML model, the reward function, or both, based on the actions taken by the human; and
   repeating the steps of running the simulations on the training data using the ML model, monitoring the actions taken by the human on the computing system, and modifying the policy network, the reward function, or both, until convergence is achieved, wherein
   the trained ML model is configured to be called by an RPA robot.

10. The computer-implemented method of claim 9, wherein the method steps are performed by the RPA robot or another RPA robot.

11. The computer-implemented method of claim 9, wherein after convergence is achieved, the method further comprises:
   deploying the ML model; and
   calling the ML model at runtime, by the RPA robot.

12. The computer-implemented method of claim 11, wherein the deployment of the ML model comprises modifying one or more activities in an RPA workflow implemented by the RPA robot to call the trained ML model.

13. The computer-implemented method of claim 11, further comprising:
   detecting, by the RPA robot, that performance of the ML model is declining beyond a predetermined performance threshold; and
   retraining the ML model until convergence is achieved.

14. The computer-implemented method of claim 13, wherein the predetermined performance threshold comprises detection accuracy or a frequency with which convergence is achieved without user action.

15. The computer-implemented method of claim 9, wherein the one or more criteria comprise a predetermined number of trials, a predetermined amount of time, or a combination thereof.

16. The computer-implemented method of claim 9, wherein the monitoring of the actions taken by the human comprises monitoring application programming interface (API) calls made based on the actions taken by the human.

* * * * *